J. P. JOHANSSON.
CAM WHEEL TRANSMISSION.
APPLICATION FILED AUG. 6, 1918.
1,312,328.
Patented Aug. 5, 1919.
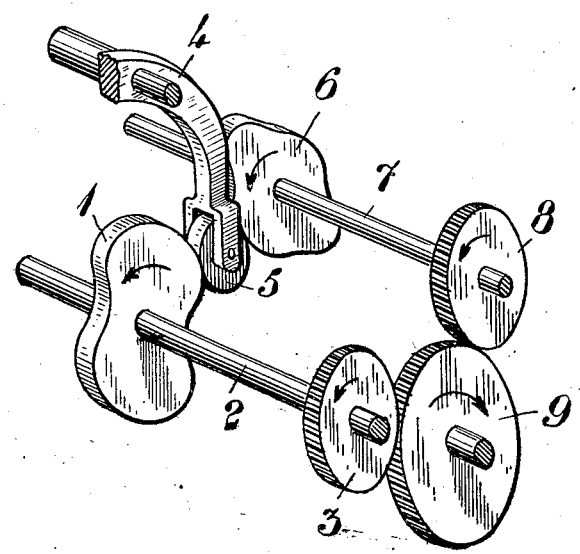
INVENTOR:
Johan Petter Johansson
By Wm Wallace White
ATTY.

UNITED STATES PATENT OFFICE.

JOHAN PETTER JÓHANSSON, OF FANNALUND, ENKÖPING, SWEDEN.

CAM-WHEEL TRANSMISSION.

1,312,328.  Specification of Letters Patent.  Patented Aug. 5, 1919.

Application filed August 6, 1918. Serial No. 248,505.

*To all whom it may concern:*

Be it known that I, JOHAN PETTER JÓ-HANSSON, a subject of the King of Sweden, residing at Fannalund, Enköping, Sweden, have invented new and useful Improvements in Cam-Wheel Transmissions, of which the following is a specification.

This invention relates to improvements in such transmissions in which the member which is to be actuated is placed between two cam wheels so that it must perform a definite movement without assistance of special springs and the like. In such transmissions now in use the cam wheels are arranged upon the same shaft and have their working faces placed perpendicular to the said shaft. This arrangement, however, has the inconvenience that the member actuated by the cam curves becomes exposed to an irregular influence, because the different parts of the same curve are situated at different distances from the center of the wheel.

According to my invention this inconvenience is avoided by the arrangement of the cam wheels upon each of two parallel shafts and placing the operative surfaces of said wheels parallel to the said shafts.

If the member to be actuated is acted upon by the wheels by an intermediate roller or the like, fixed upon the said member, the two cam wheels according to one form of this invention are arranged to revolve in the same direction, so that also the roller always revolves in the same direction, either it is acted upon by the one or the other of the cam wheels. This movement can be obtained by placing a toothed wheel upon the one or both ends of the two shafts of the cam-wheels which toothed wheels gear with an intermediate such wheel.

In the accompanying drawing a form of such a transmission is illustrated in a perspective view.

1 is the one cam wheel, 2 its shaft and 3 a toothed wheel upon the said shaft. 4 is the member actuated by the cam wheel and provided with a rotatable roller 5 at that part where it is acted upon by the said wheel. According to the invention the member 4 is pressed against the cam wheel 1 by means of another cam wheel 6, placed upon a shaft 7 parallel to the shaft 2. Hereby the roller 5 is necessitated to uniformly and continuously follow the operative surface of the cam wheel 1 (which surface is parallel to the shaft 2) and thus all shocks are obviated, which appear when springs or the like are used. The shaft 7 of the cam wheel 6 is provided with a toothed wheel 8, which as the toothed wheel 3 gears with a common gear wheel 9. In this manner the shafts 2 and 7 and thus also the cam wheels 1 and 6 are brought to revolve in the same direction so that the roller 5 between them always moves in the same direction, either it is acted upon by the wheel 1 or the other wheel 6.

The invention is of special importance for such machines in which (as for instance in shoe making machines) several cams or cam wheels are necessary and in which the space, especially aside is very limited.

Having now particularly described the nature of my invention and the manner of its operation, what I claim is:

1. A transmission mechanism comprising a movable member, a pair of shafts, a pair of cam wheels fixed to said shafts and having the cam surfaces thereof arranged parallel to the shafts, and a roller carried by the member and constantly contacting with the cam surfaces of the wheels.

2. A transmission mechanism comprising a pair of spaced shafts, means for rotating said shafts in the same direction, a cam wheel on each of said shafts having the cam surfaces thereof disposed parallel to the shafts, and a movable member contacting with the cam surfaces of both of the cam wheels.

3. A transmission mechanism comprising a movable member, means for intermittently moving said member, comprising parallel spaced shafts, cam wheels fixed at opposite points on said shafts, said wheels having the cam surfaces thereof parallel to the shafts and contacting with said member, a gear on each of said shafts, and a driving gear meshing with said gear, whereby said shafts are driven in the same direction.

In testimony whereof I have signed my name to this specification.

JOHAN PETTER JÓHANSSON.

Copies of this patent may be obtained for five cents each, by addressing the "Commissioner of Patents, Washington, D. C."